(12) United States Patent  (10) Patent No.: US 7,367,913 B2
Krammer et al.  (45) Date of Patent: May 6, 2008

(54) WET BRAKE SYSTEM FOR VEHICLES

(75) Inventors: Martin Nikolaus Krammer, Shevlin, MN (US); John Edward Hamrin, Bemidji, MN (US); Joel Anderson, Bagley, MN (US); Gregory Lee Maki, Solway, MN (US)

(73) Assignee: TEAM Industries, Inc., Bagley, MN (US)

( * ) Notice: Subject to any disclaimer, the term of this patent is extended or adjusted under 35 U.S.C. 154(b) by 119 days.

(21) Appl. No.: 11/057,399

(22) Filed: Feb. 11, 2005

(65) Prior Publication Data

US 2006/0183591 A1 Aug. 17, 2006

(51) Int. Cl.
*F16H 48/20* (2006.01)
*F16H 48/06* (2006.01)
(52) U.S. Cl. ..................... 475/224; 475/231
(58) Field of Classification Search ............... 475/231, 475/224
See application file for complete search history.

(56) References Cited

U.S. PATENT DOCUMENTS

| | | | |
|---|---|---|---|
| 1,847,828 A | 3/1932 | Gerling | |
| 2,424,942 A | 7/1947 | Mynssen | |
| 4,559,846 A | 12/1985 | Cochran et al. | |
| 4,715,467 A | 12/1987 | Sakai | |
| 4,876,921 A | 10/1989 | Yasui et al. | |
| 4,893,525 A | 1/1990 | Gabor | |
| 4,950,214 A * | 8/1990 | Botterill | 475/231 |
| 5,007,886 A | 4/1991 | Holmquist et al. | |
| 5,080,640 A | 1/1992 | Botterill | |
| 5,190,123 A | 3/1993 | Hvolka | |
| 5,195,604 A | 3/1993 | Brockett et al. | |
| 5,366,040 A | 11/1994 | Irikura et al. | |
| 5,484,347 A | 1/1996 | Holmquist | |
| 5,501,640 A | 3/1996 | Hauser et al. | |
| 5,804,935 A | 9/1998 | Radev | |
| 6,146,304 A * | 11/2000 | Bendtsen | 475/230 |
| 6,261,201 B1 | 7/2001 | Hauser et al. | |
| 6,293,890 B1 | 9/2001 | Kaku | |
| 6,301,884 B1 | 10/2001 | Hauser et al. | |
| 6,345,712 B1 | 2/2002 | Dewald et al. | |
| 6,354,421 B1 | 3/2002 | Mochizuki et al. | |
| 6,659,256 B2 | 12/2003 | Seki et al. | |
| 6,866,605 B2 | 3/2005 | Fabry | |
| 2001/0027651 A1 | 10/2001 | Hauser et al. | |

* cited by examiner

*Primary Examiner*—Tisha Lewis
(74) *Attorney, Agent, or Firm*—IPLM Group, P.A.

(57) ABSTRACT

A brake system (20) includes a differential carrier (22, 121) and output gear (26) operatively connected. At least one carrier rotary friction surface (43) is operatively connected to the differential carrier (22, 121). At least one side gear rotary friction surface (45) is operatively connected to one of the side gears (31, 33). At least one limited rotary friction surface is operatively connected to the case, whereby during a braking operation the carrier rotary friction surface and the side gear rotary friction surface are pressed together causing braking of the differential carrier and the first and second differential side gears (31, 33). The carrier (22, 121) is supported by the first and second differential side gears (31, 33).

8 Claims, 17 Drawing Sheets

WET BRAKE SYSTEM FOR VEHICLES

BACKGROUND OF THE INVENTION

1. Field of the Invention

This invention relates generally to a wet brake system and more particularly to a wet brake system wherein a series of plates are operatively connected to the differential carrier, housing and a differential side gear.

2. Description of the Prior Art

The present invention is applicable to smaller vehicles, either electric or gas, and may be incorporated into either the front or the rear axles. Examples of such vehicles are ATV's, golf, turf and light utility vehicles. Drum brakes on such vehicles have a typical problem in that they wear out and make noise. The semi-metallic shoes and rotors wear from normal use and from being exposed to the elements. Additionally, they have a tendency to squawk as parts wear.

One example of a wet brake system that has been developed for such vehicles is disclosed in U.S. Pat. No. 6,293,890 entitled "Brake System for Vehicles" and assigned to Kawasaki. This patent describes a brake system for use in vehicles wherein the brake system is tied to the differential carrier and axle. The present invention ties the brake system to the differential and a side gear and not to the axle. Still further, the present invention addresses the problems of bias and provides for a brake system which helps to eliminate bias between the two wheels driven by the differential.

SUMMARY OF THE INVENTION

In one embodiment, the invention is a brake system for use in a vehicle. The brake system includes a differential carrier and an output gear operatively connected thereto. A case defines a cavity for housing the differential carrier. At least one carrier rotary friction surface is operatively connected to the differential carrier. A differential mechanism has first and second differential side gears. At least one side gear rotary friction surface is operatively connected to one of the first and second differential side gears. At least one limited rotation friction surface is operatively connected to the case whereby during a braking operation the at least one carrier rotary friction surface and the at least one side gear rotary friction surface are pressed together causing braking of the differential carrier and the first and second differential side gears. The carrier is supported by the first and second differential side gears. In a preferred embodiment, the invention further comprises the at least one carrier rotary friction surface and the at least one side gear rotary friction surface are positioned adjacent to each other and have direct contact during a braking event, whereby braking torque biasing is reduced.

In another embodiment, the invention is a brake system for use in a vehicle. The brake system includes a differential carrier and an output gear operatively connected thereto. A case defines a cavity for housing the differential carrier. At least one carrier rotary friction plate is operatively connected to the differential carrier. A differential mechanism has first and second differential side gears. At least one side gear rotary friction plate is operatively connected to one of the first and second differential side gears. At least one limited rotation friction plate is operatively connected to the case whereby during a braking operation the at least one carrier rotary friction plate and the at least one side gear rotary friction plate are pressed together causing braking of the differential carrier and the first and second differential side gears. The carrier is supported by the first and second differential side gears.

DETAILED DESCRIPTION OF A PREFERRED EMBODIMENT

Figure 1:
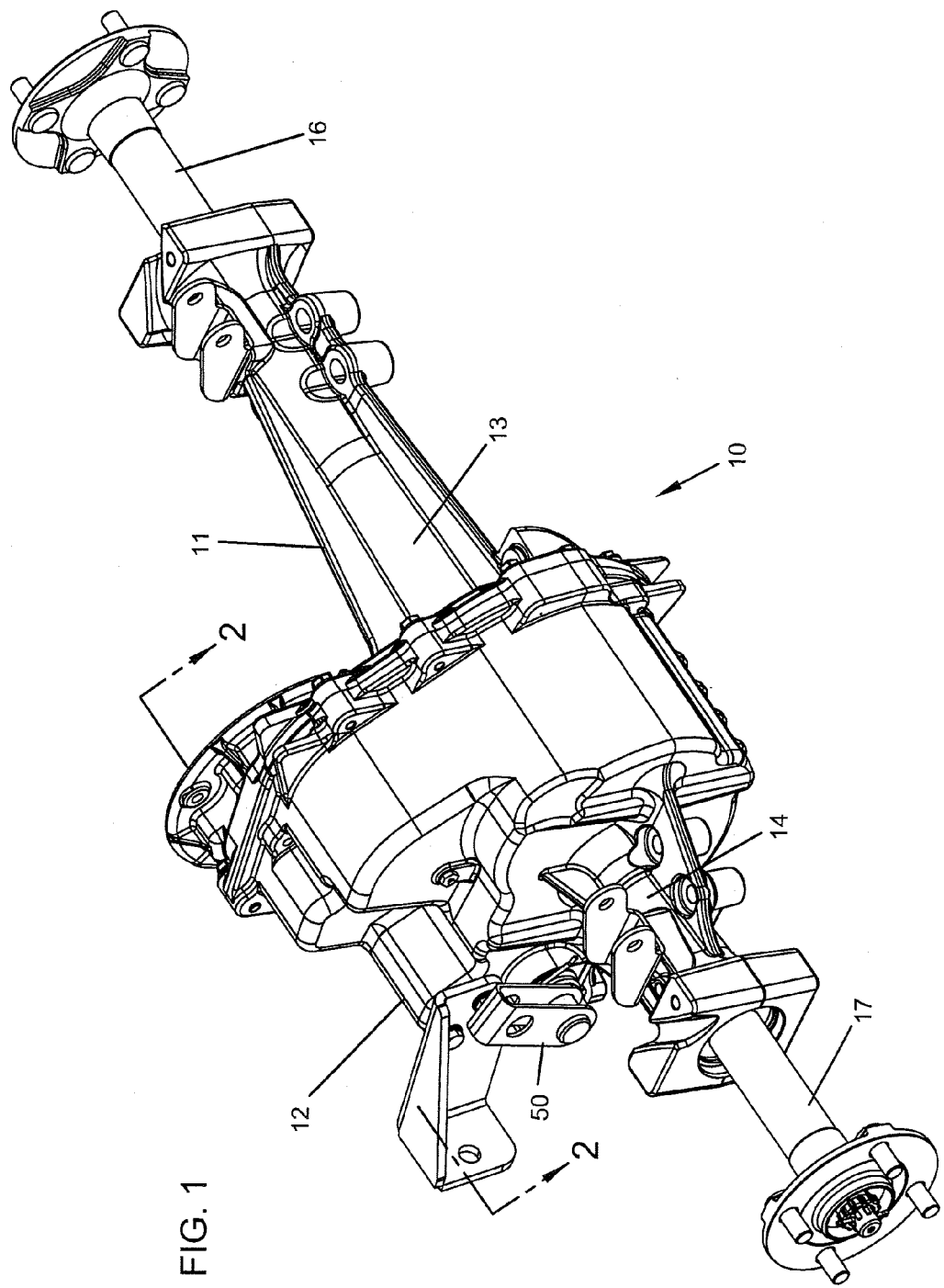
FIG. 1 is a perspective view of a drive train according to the present invention.

Referring to the drawings, wherein like numerals represent like parts throughout the several views, there is generally disclosed at 10 a transaxle. The transaxle 10 includes a right gear case half 11 operatively connected to a left gear case 12. Also shown in a right axle tube 13 operatively connected to the right gear case half 11 and a left axle tube 14 operatively connected to the left gear case half 12. The axle tubes 13 and 14 are shown as being integral with the gear case halves 11, 12. A brake lever 50, which will be described in more detail hereafter, is operatively connected to the transaxle 10. The transaxle 10, described thus far, is illustrative of just one transaxle for which the wet brake system of the present invention may be utilized. It is understood that another transaxle or a gear box may be utilized and further the transaxle or gear box may either be a front or a rear. In addition, the driving force may be either electrical or gas.

Figure 3:
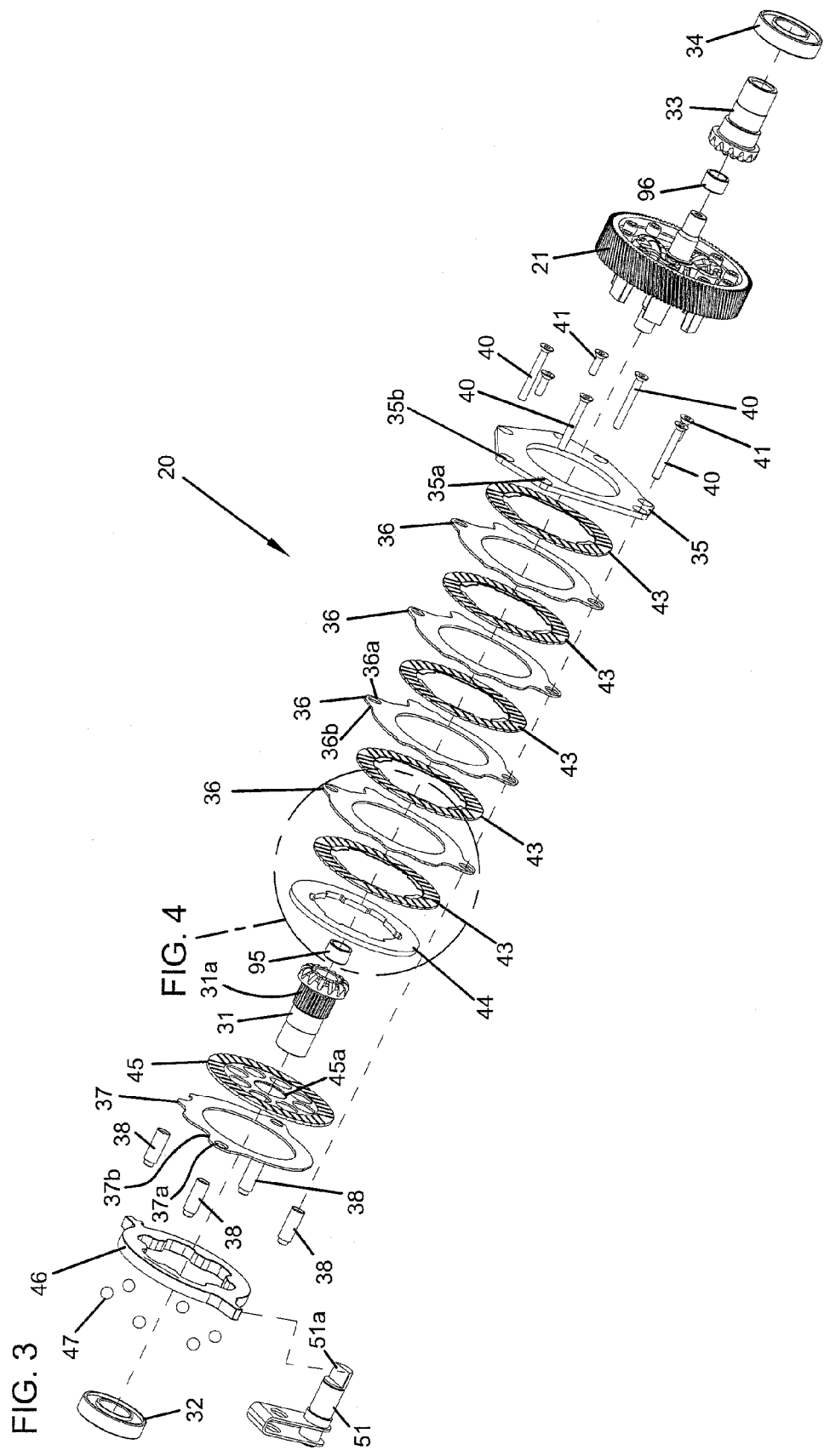
FIG. 3 is an exploded perspective of a portion of the invention shown in FIG. 2.
Figure 4:
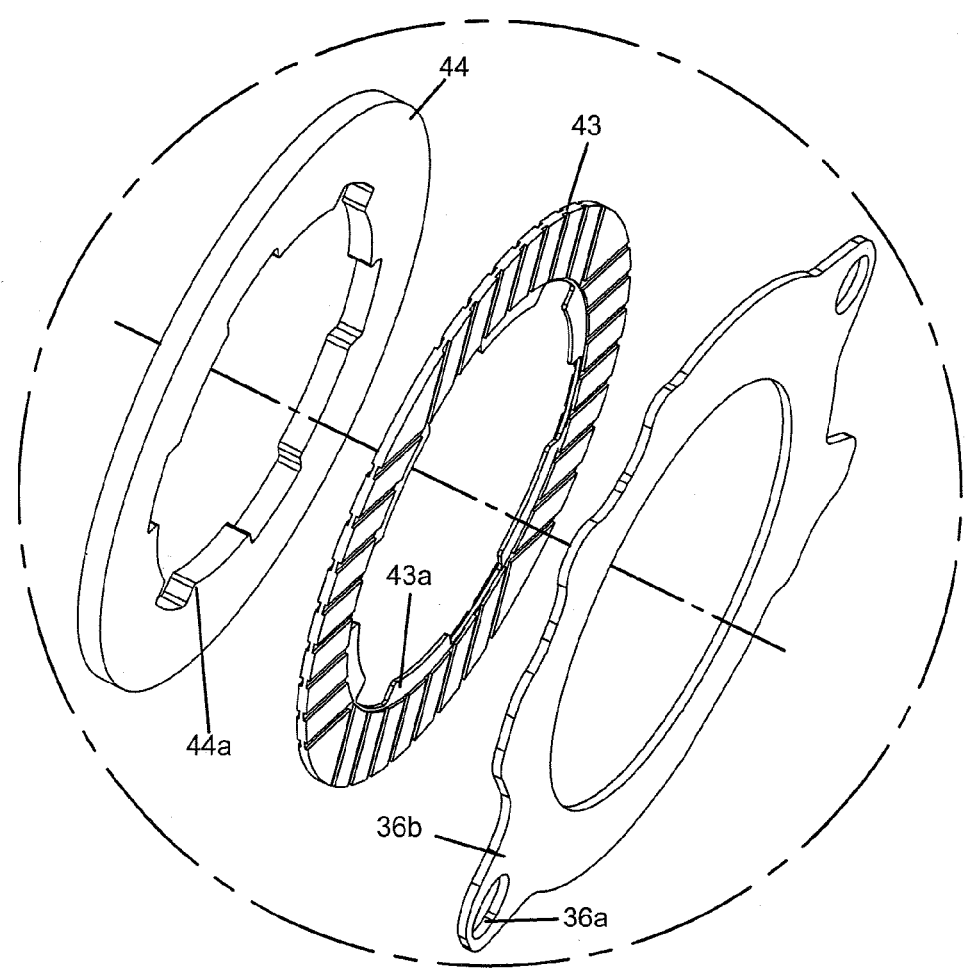
FIG. 4 is an enlarged view of a portion of the invention circled in FIG. 3.
Figure 5:
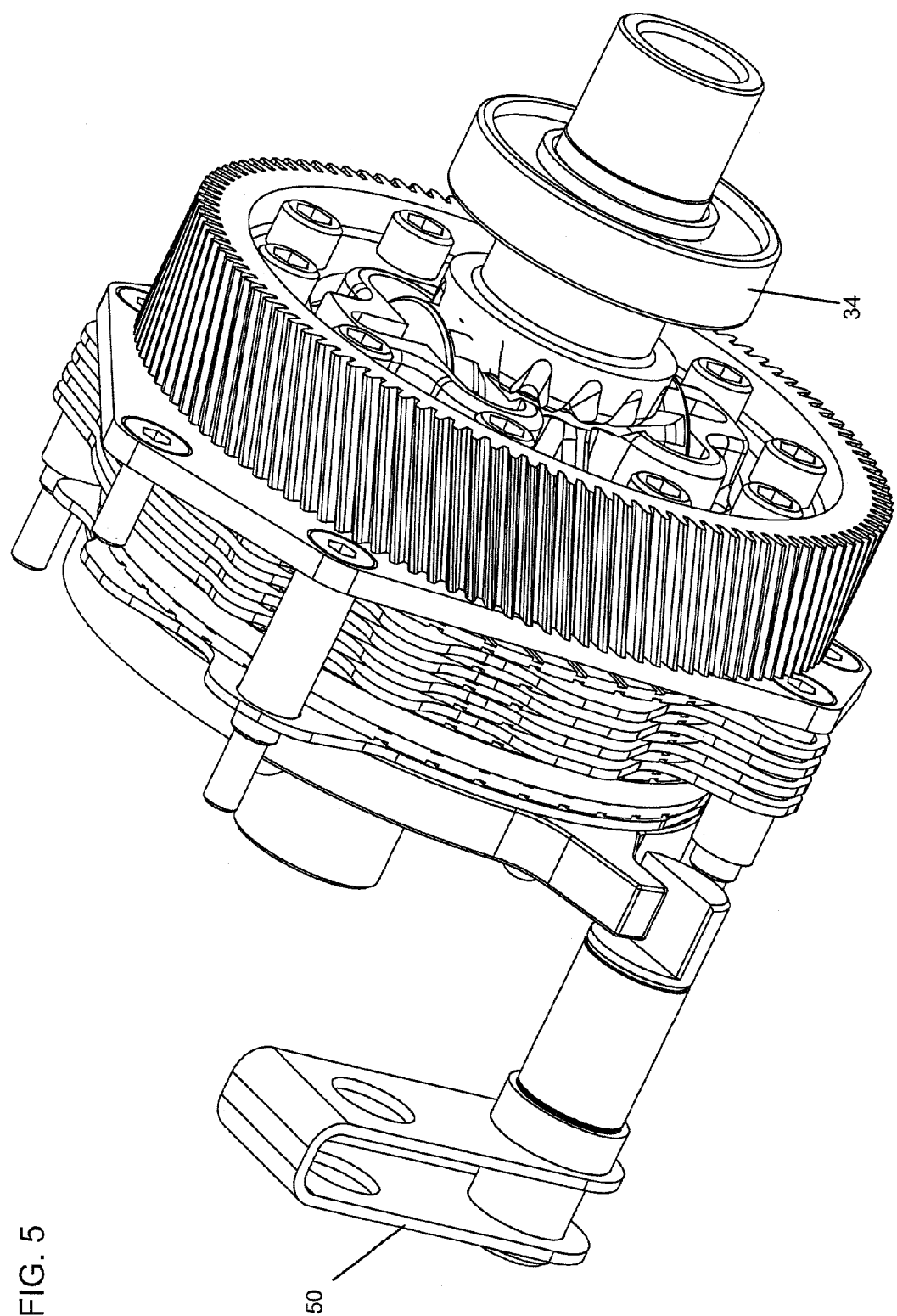
FIG. 5 is an assembled perspective view of the components of FIG. 3.
Figure 6:
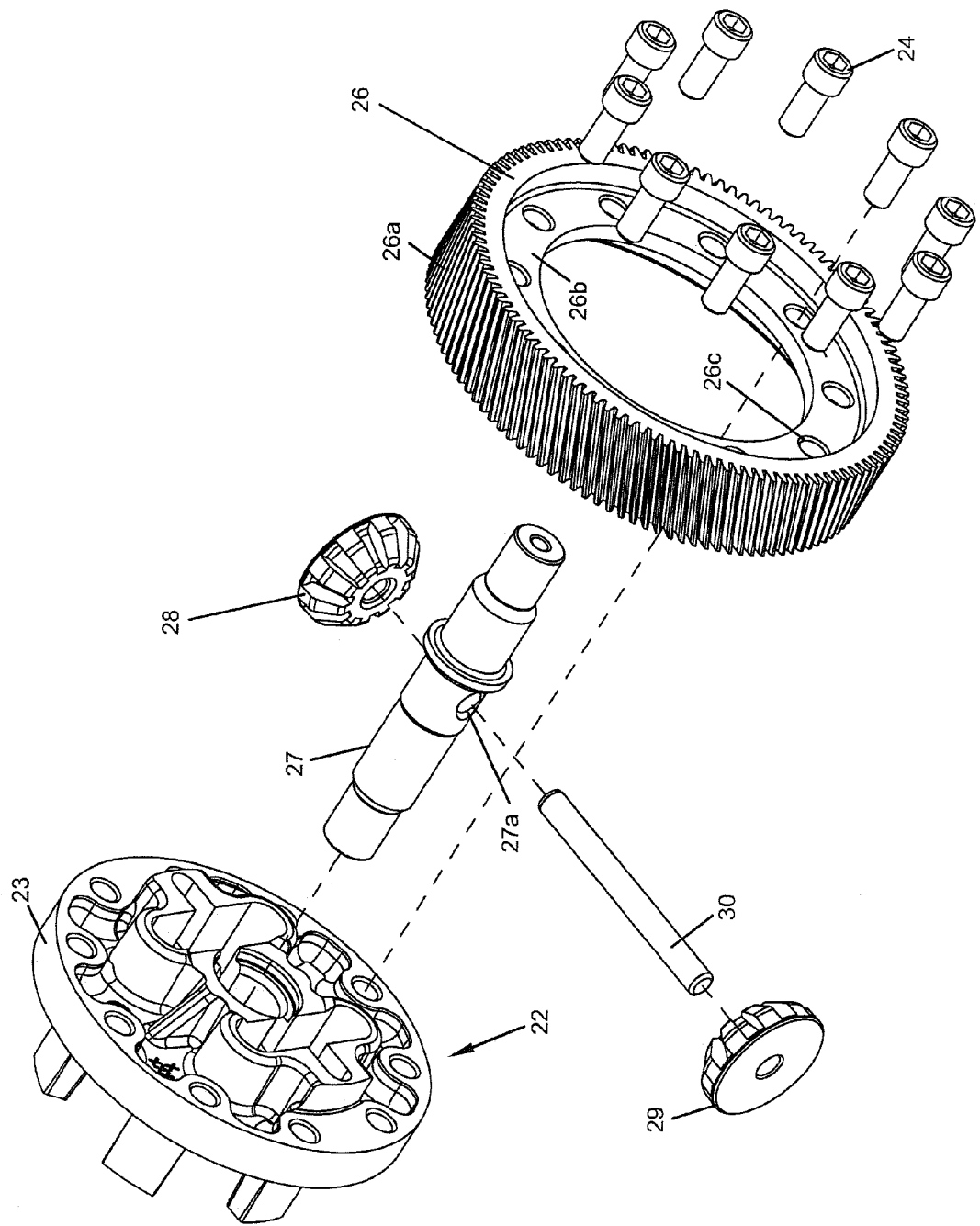
FIG. 6 is an exploded perspective view of the carrier and ring gear portion of the invention shown in FIG. 3.
Figure 7:
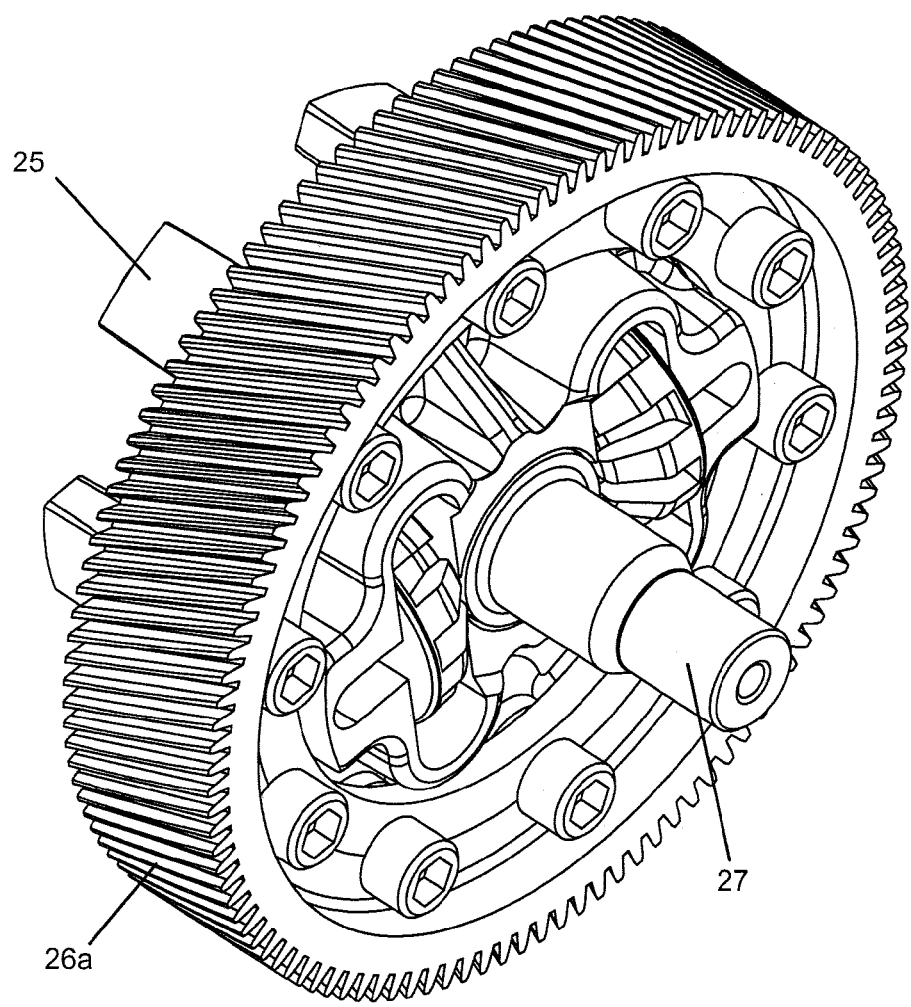
FIG. 7 is an assembled view of the carrier and ring gear shown in FIG. 6.
Figure 8:
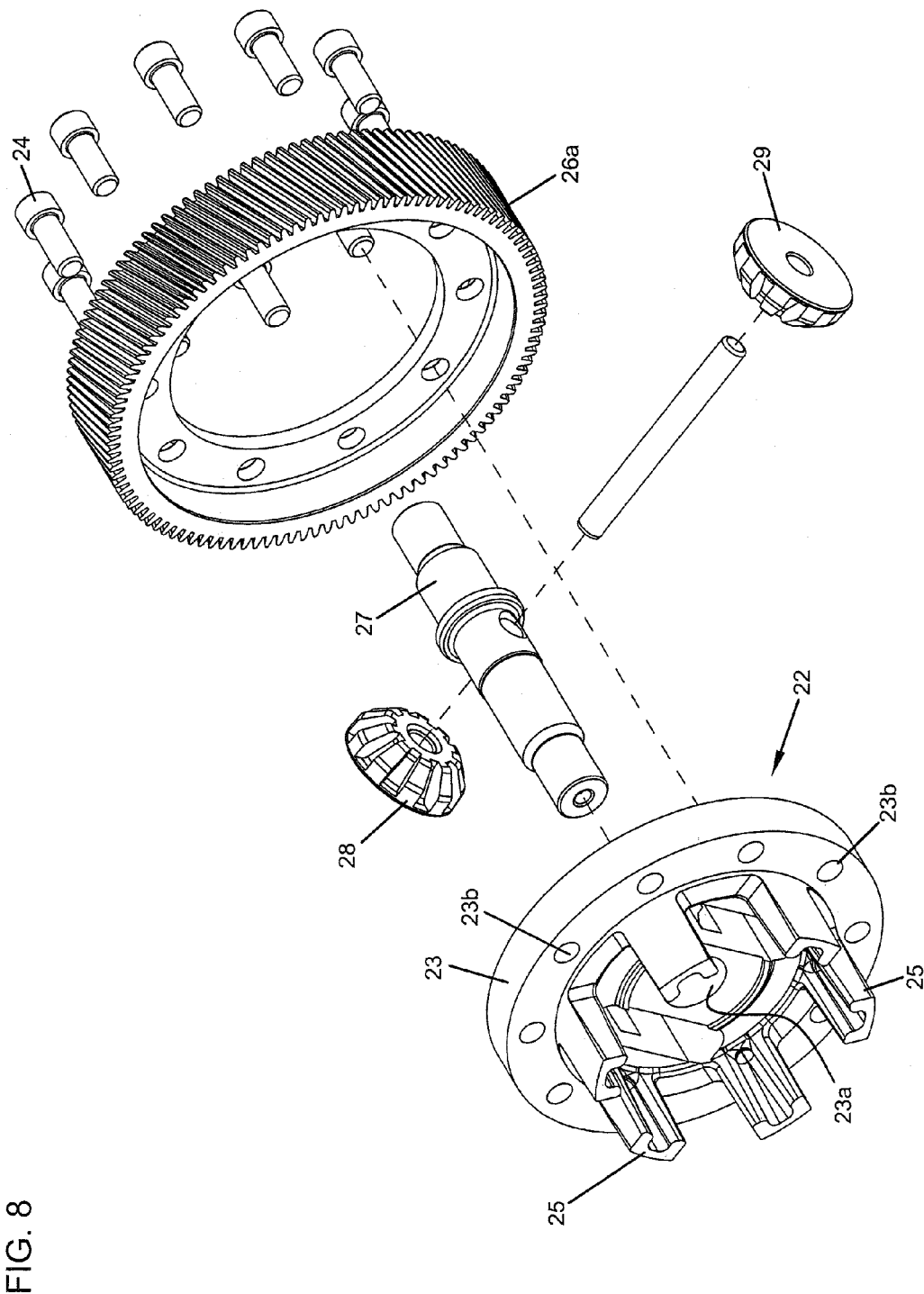
FIG. 8 is an exploded perspective view of the carrier and ring gear shown in FIG. 6, viewed from the left.
Figure 9:
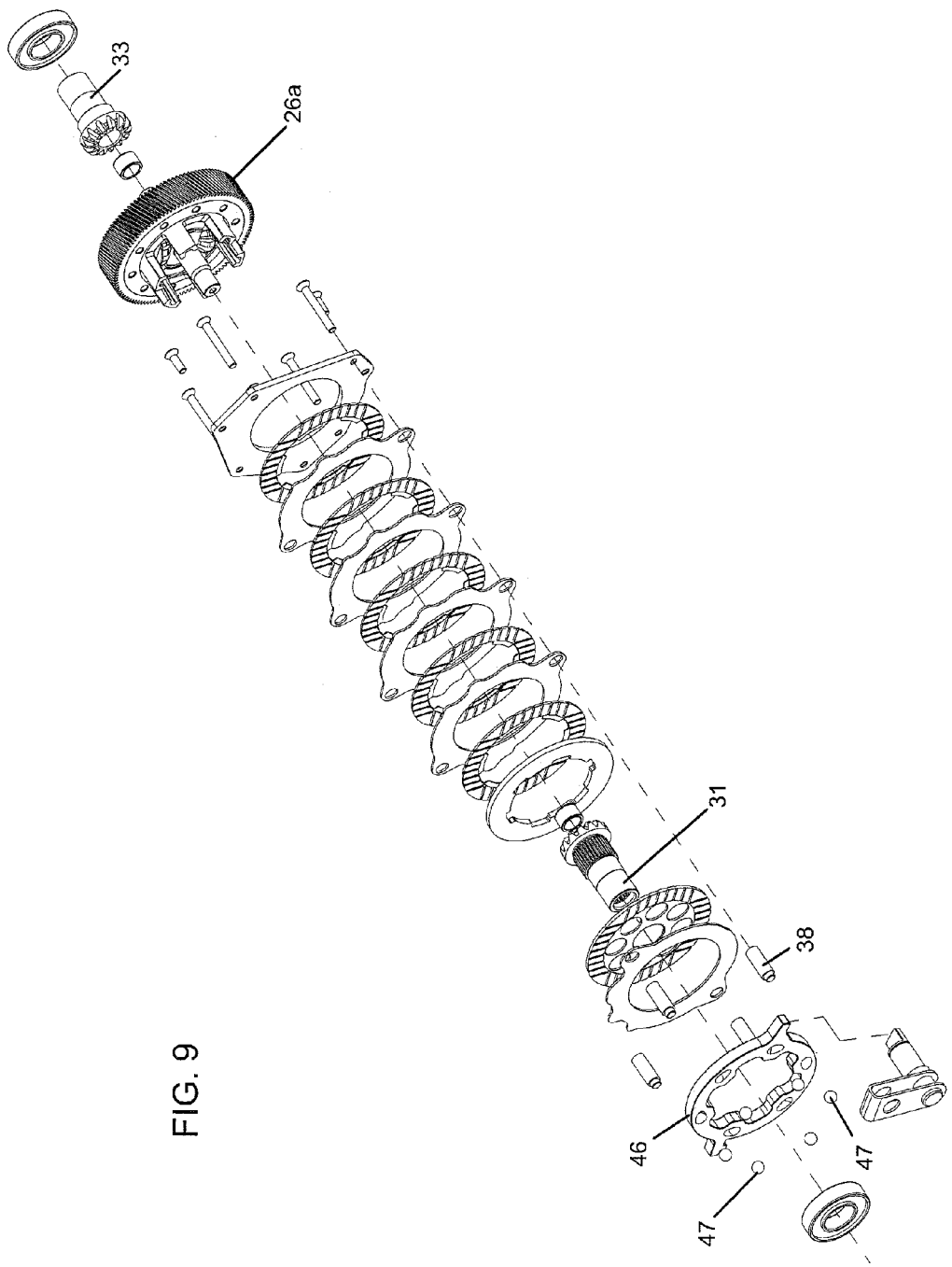
FIG. 9 is an exploded perspective view, similar to that shown in FIG. 3, however, shown from the left.

Referring now to FIGS. 3 and 9, there are shown exploded perspective views of the brake system 20 of the present invention. The brake system 20 includes a carrier and ring gear assembly 21, as shown in FIGS. 6-8. The carrier and ring gear assembly 21 includes a differential carrier 22. The differential carrier 22 has a base 23 having a central bore 23a. A plurality of openings 23b are formed in the base 23 and are adapted and configured to receive bolts 24. Six towers 25 extend to the left, as viewed in FIGS. 6-8. The towers are generally rectangular and are configured to form a spline for operatively connecting thereto friction plates, as will be described more fully hereafter. An output gear 26 having a plurality of teeth 26a has a circular member 26b having a plurality of holes 26c formed therein. The bolts 24 pass through the holes 26c and are secured in the openings 23b to secure the output gear 26 to the differential carrier 22. As is well known in the art, a differential carrier shaft 27 is positioned through the bore 23a and first and second pinion gears 28, 29 are mounted on a differential pin 30 which is positioned through a bore 27a in the differential carrier shaft 27.

Figure 13:
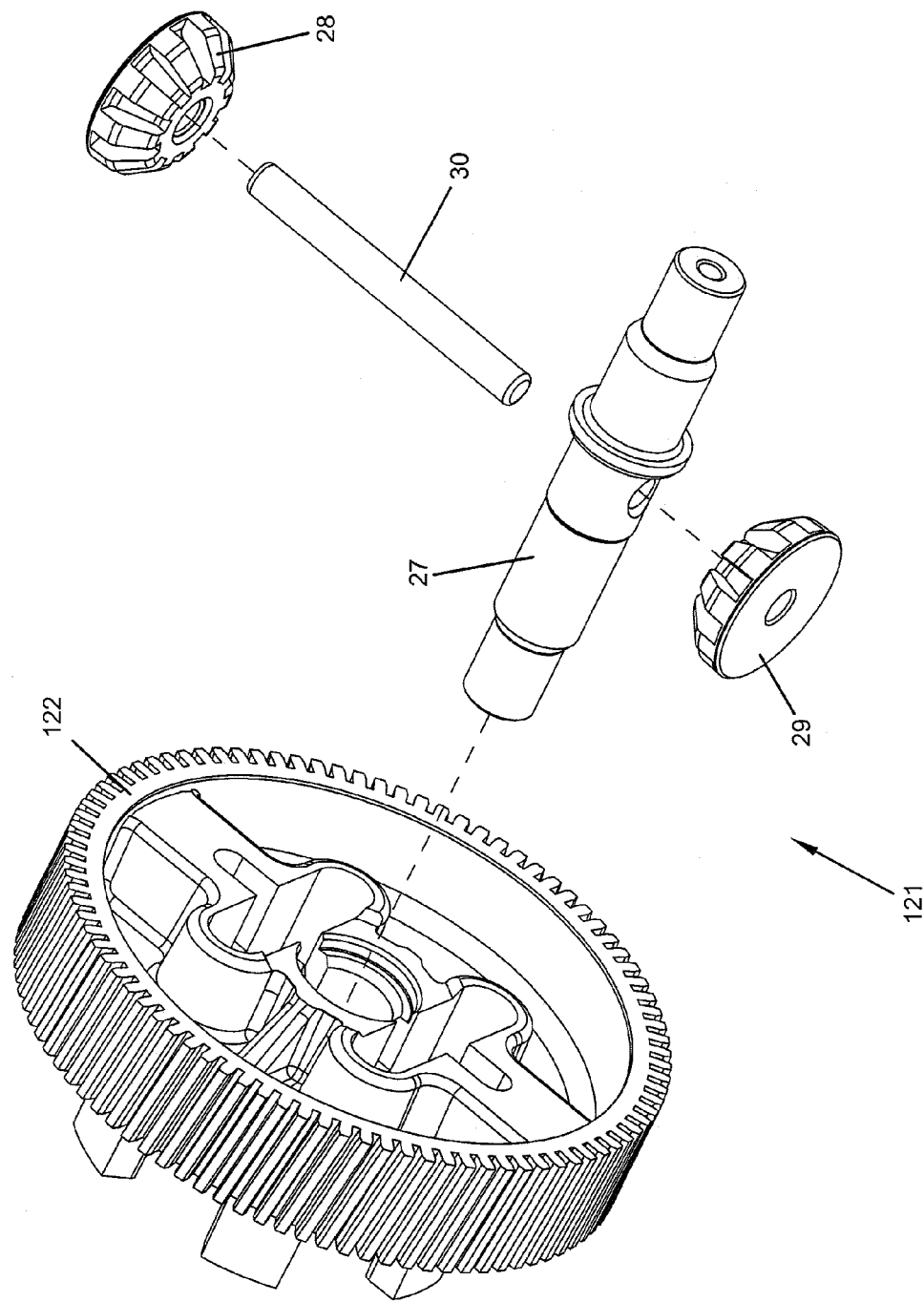
FIG. 13 is an exploded perspective view of another embodiment showing an integrated ring gear and carrier.

Another embodiment of a carrier and ring gear is shown in FIG. 13. The integrated carrier and ring gear 121 is similar to the carrier and ring gear assembly 21 except the differential carrier and output gear are combined into an integral one-piece unit 122. The carrier and ring gear assembly 121 utilizes similar shaft 27, first pinion gear 28, second pinion gear 29 and differential pin 30. Either carrier and ring gear assembly 21 or 121 may be utilized in the present invention.

Figure 2:
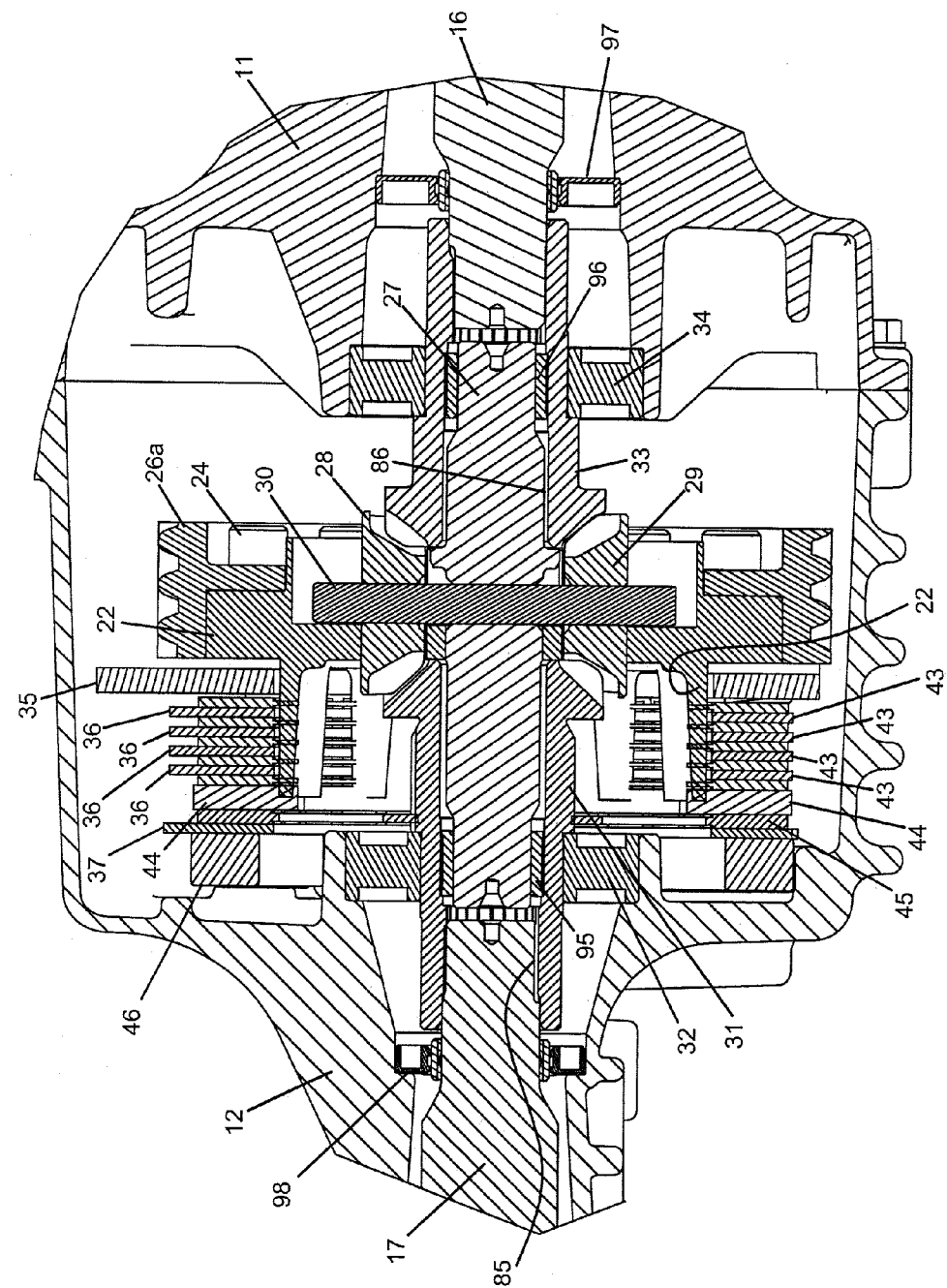
FIG. 2 is a cross-sectional view taken generally along the lines 2-2 of FIG. 1.

The braking system 20 is a wet type multi-plate braking system that may be either partially or completely submerged in a fluid inside of the transaxle 10. Referring now, especially to FIGS. 2, 3 and 9, the transaxle includes the right gear case half 11 and left gear case 12 operatively connected, by means well known in the art, to form the chamber in which the braking system 20 is either partially or completely submerged. A left differential side gear 31 is supported on the left gear case half 12 by bearing 32. A right differential side gear 33 is supported in the right gear case half 11 by bearing 34. The differential side gears 31, 33 are respectively coupled to axles 16, 17 through an interface of splines 85, 86 or other suitable connections well known in the art. The axles, 16 and 17, are positioned in the axle tubes 13, 14.

The left and right side gears 31, 33 support the rotatable carrier and ring gear assembly 21 or 121 through the shaft 27, which is supported on bearings 95, 96. Through the carrier 21 or 121, the two smaller rotatable differential pinion gears 28, 29 are also supported. The differential pinion gears 28, 29 are at right angles to the two differential side gears 31, 33 with respect to the axles 16, 17. The brake system 20 includes multiple stationary friction plates. The friction plates include a top stationary friction plate 35, four intermediate stationary friction plates 36 and a bottom stationary friction plate 37. Four spacer tubes 38 are pressed into bores 39 that are formed in the left case half 12. Four longer screws 40 go through four openings 35a formed in the top friction plate 35 and go through the spacer tubes 38 and are secured into the bores 39 of the left casing half 12. The intermediate reaction plates 36 have two openings 36a formed in two protrusions 36b. Similarly, the bottom stationary friction plate 37 has two openings 37a formed in protrusions 37b. Two of the spacer tubes 38 are utilized to be positioned in the two openings 36a in plates 36. The other two spacer rubes 38 are utilized to be positioned in openings 37a of plate 37. Three shorter screws 41 go through three additional openings 35b and are seated in three bores 42 also formed in the left case half 12. The top stationary friction plate 35 is constrained to the case 12 in all six degrees of motion. However, the stationary plates 36, 37 are allowed translational motion along the axle axis. While the stationary plates 36 and 37 are referred to as "stationary" plates, it is understood that there is a small difference in the inner diameter of openings 36a and 37a and the outer diameter of the tubes 38, thereby allowing a very limited amount of rotational movement. The difference or clearance is preferably about 0.060 inches, although other suitable clearances may also be used.

A plurality of rotary friction plates are utilized. The rotary friction plates include five rotary friction plates 43 that are carried by the carrier 22 as will be described more fully hereafter. Another rotary friction plate 44 is slightly larger in width than the rotary friction plates 43. Rotary friction plate 44 is also carried by the carrier 22. A side gear rotary friction plate 45 is carried by the left side differential gear 31, as will be described more fully hereafter. The rotary friction plates 43 have six generally rectangular spline interfaces 43a formed on their inner diameter. The spline interfaces 43a are sized and configured to match the shape of the towers 25. The rotary friction plates 43 are positioned on the towers 25 so that the rotary friction plates 43 rotate with the differential carrier 22. Further, translational movement along the axis of the axle is also allowed. The rotary friction plate 44 also has six spline interfaces 44a that are similarly sized and configured to match the shape of the towers 25. The rotary friction plate 44 therefore rotates with the carrier 22 and translational movement is also allowed along the axis of the axle. In viewing FIG. 2, it can be seen that the tower 25 extends only approximately halfway through the friction plate 44. The friction plate 44 is still supported and carried by the tower 25. However, that portion of the friction plate 44 that extends to the left of the tower 25 provides for a contact surface and ensures that the side gear rotary friction plate 45 does not contact the tower 25 as wear occurs. The side gear rotary friction plate 45 has a plurality of grooves 45a that form a spline interface with the longitudinal grooves 31a formed in the left side gear 31. The spline interface ties the rotational movement of the rotary friction plate 45 to that of the left side gear 31 while still allowing movement along the longitudinal axis.

Figure 10:
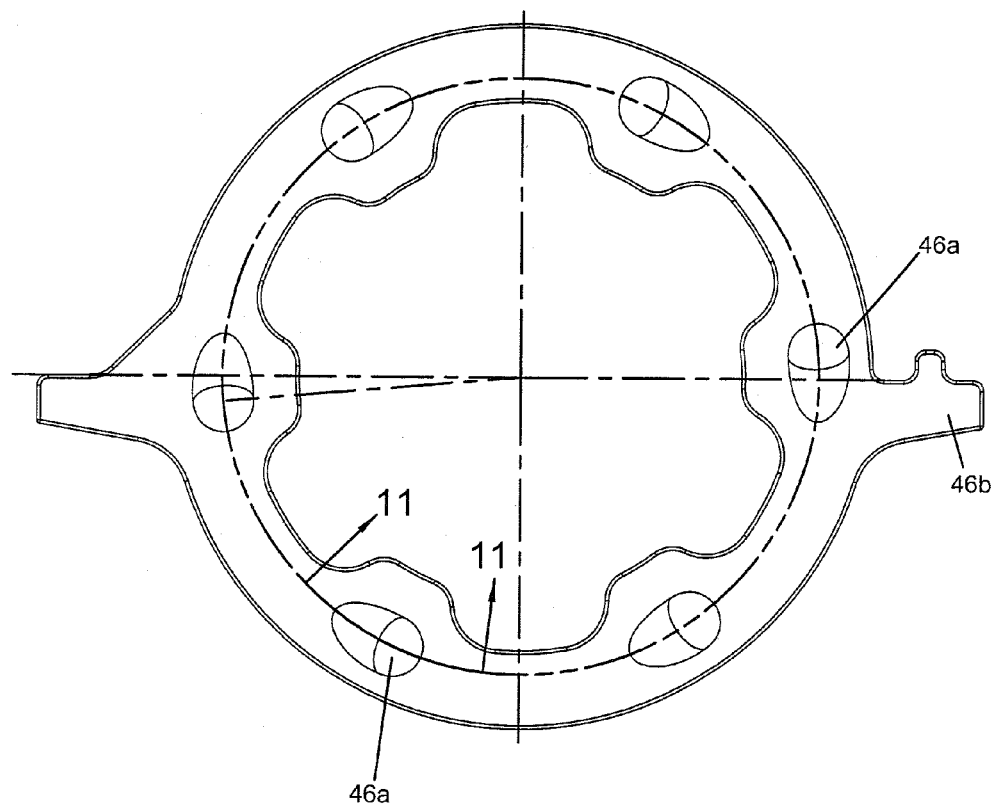
FIG. 10 is a flat plan view of the ball ramp plate shown in FIG. 3.
Figure 11:
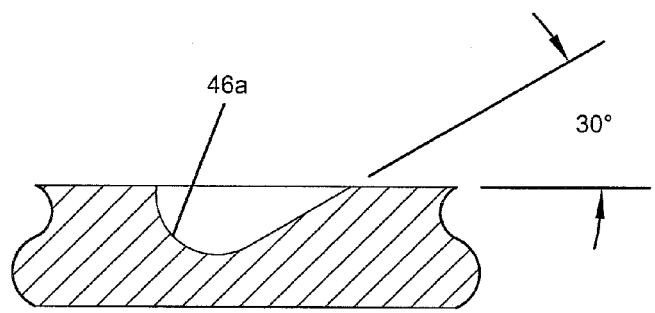
FIG. 11 is an enlarged sectional view of a portion of the ball ramp shown in FIG. 10, taken generally along the lines 11-11.
Figure 12:
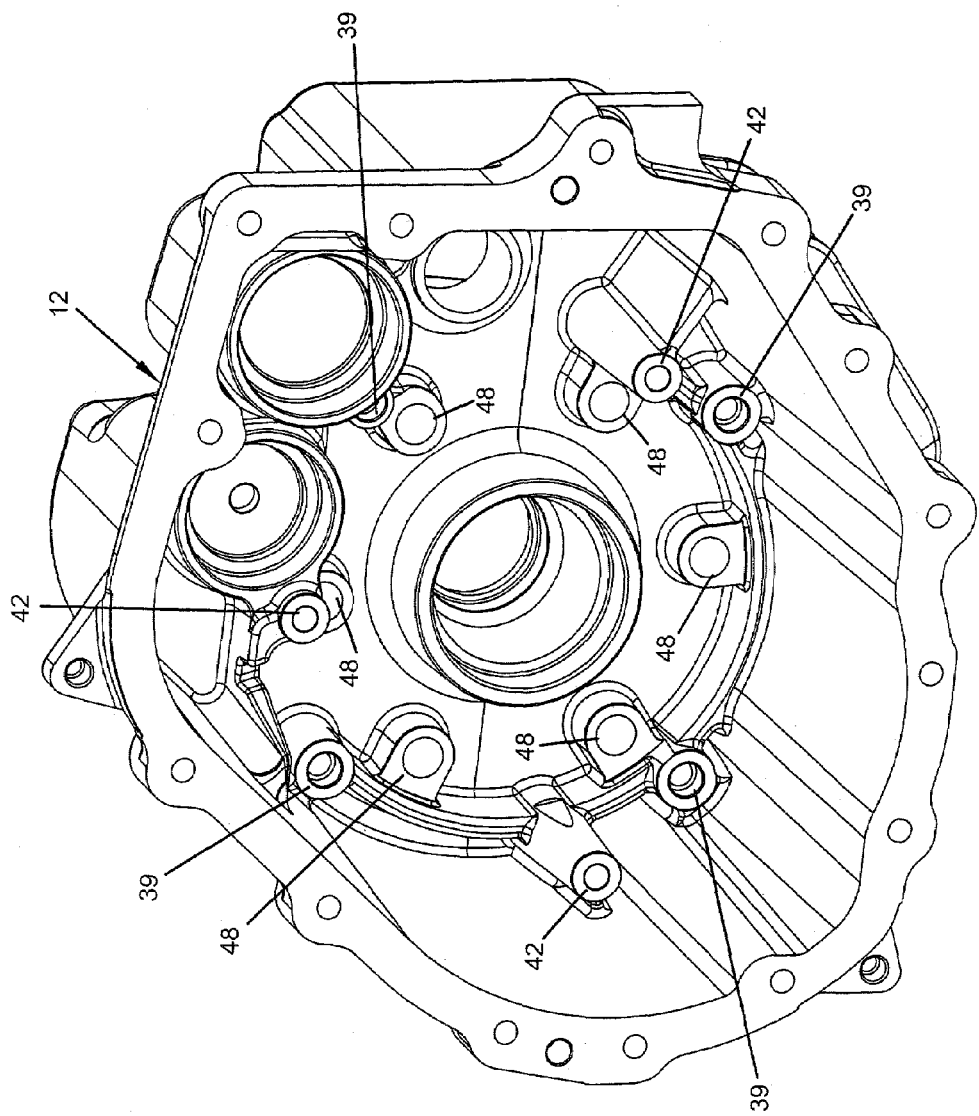
FIG. 12 is a perspective view showing the interior of a portion of the case shown in FIG. 1.

A ball ramp plate 46 is positioned between the bottom stationary friction plate 37 and the left case half 12. Six balls 47 are positioned in pockets 48 formed in the left case half 12. The ball ramp 46 is supported by the balls 47. The ball ramp plate 46 has six cam grooves 46a, best seen in FIGS. 10 and 11. The balls 47 are also positioned in the cam grooves 46a, thereby supporting the ball ramp plate 46. A brake lever 50 is operatively connected, by means well known in the art, by a brake lever shaft 51. At the end of the shaft 51 is a cam interface 51a. The cam interface 51a is positioned to contact the ball ramp plate 46 at extension 46b. Therefore, when the brake is activated, a suitable cable mechanism (not shown), which is well known in the art, will rotate the brake lever 50, and thereby the shaft 51 so as to cause the cam interface 51a to contact the projection 46b thereby rotating the ball ramp plate 46. When the ball ramp plate 46 is rotated through the brake lever 50, the interface between the balls 47 and the cam grooves 46a create motion both rotationally about the axle axis and in translational motion along the axle axis, to the right as shown in the figures. This provides the clamping force to the brake system 20. This translational or longitudinal motion is used to squeeze the rotary plates 43, 44 and the stationary plates 35, 36 and 37 to create a resistance to rotation of the side differential gear 31 and the carrier 22. This will in turn cause resistance to the rotation of the axles 16, 17. The ball ramp has a small rotational movement of approximately 7 degrees, although other suitable amounts may be utilized.

The brake squeeze occurs between the translational movement of the ball ramp plate 46 and the top stationary friction plate 35 that is constrained to the case half 12 in all six degrees of motion. The top stationary friction plate 35 acts as the final stationary friction plate in the brake pack. All of the other stationary friction plates 36, 37 do not allow rotation about the axle axis, but they are allowed translational motion along the axle axis. This is achieved by interfacing the stationary friction plate 36, 37 over spacer tubes 38 positioned and held between the case half 12 and the top stationary friction plate 35. The spacer tubes 38, as previously discussed are constrained to the left case half 12. As previously discussed, the side gear rotary friction plate 45 is supported by the differential side gear 31 and the rotary friction plates 43 and 44 are supported by the differential carrier 22. The spline interface on the side gear rotational friction plate 45 constrains relative rotational motion between the left side gear 31 and the rotary friction plate 45, but it does allow translational motion along the axle axis. The spline interface with the rotary friction plates 43 and 44 constrain the relative rotational movement between the carrier 22 and the rotary friction plates 43, 44 but does allow for translational motion on the towers along the axle axis. Oil seals 97, 98 are provided so as to make a fluid-tight cavity in which the brake system 20 may be submerged or partially submerged in fluid, as is well known in the art The brake system 20 of the present invention, thereby provides for braking when a vehicle is parked and possibly one of the wheels is able to slip. However, in the prior art, by alternating the stationary and rotary friction plates, a bias is introduced into the system. However, in the present invention, biasing is reduced or eliminated by varying the alternating arrangement of rotary and stationary friction plates. The typical arrangement is to have alternating rotary and friction plates. The present invention does so with respect to the rotary friction plates 43 and the stationary friction plates 35 and 36. However, there are three rotary friction plates 45, 44 and 43 adjacent each other. Rotary plates 43 and 44 are tied to the carrier 22 and rotary friction plate 45 is tied to the side gear 31. Rotary friction plate 45 directly interacts with the rotary friction plate 44 and helps to synchronize the side gear 31 to the carrier 22 to reduce or eliminate the braking torque bias experienced on the two side gears. While it has been found advantageous to use two rotary friction plates 44, 43 adjacent and tied to the carrier in this arrangement of rotary plates, it is recognized that it is only necessary to have at least one rotary friction plate tied to the carrier. This provides for adjacent and interacting rotary friction plates, with one 43 or 44 tied to the carrier and one 45 tied to the side gear.

It is understood that the foregoing has described the brake system 20 as being operatively connected to the left side gear 31. It is understood that the brake system 20 could also be operatively connected to the right side gear 33.

In this application, while in the prior art the plates 36 and 37 are referred to as stationary and the ball ramp is also relatively stationary, the term "limited rotary" is used to refer to both in recognition of their small amount of rotational movement. It being understood that "limited rotary" in some instances could be designed down to true stationary.

The plates, 35-37, 43-45, all have two surfaces. It is clear from the foregoing description and the drawings the interaction of the two surfaces of each plate and their interaction with their adjacent plates. However, it is also understood that there are embodiments wherein a differential side gear, differential carrier or case may be utilized as either a rotary friction surface or a stationary friction surface. FIGS. 14-18 are schematic representations of such embodiments.

Figure 14:
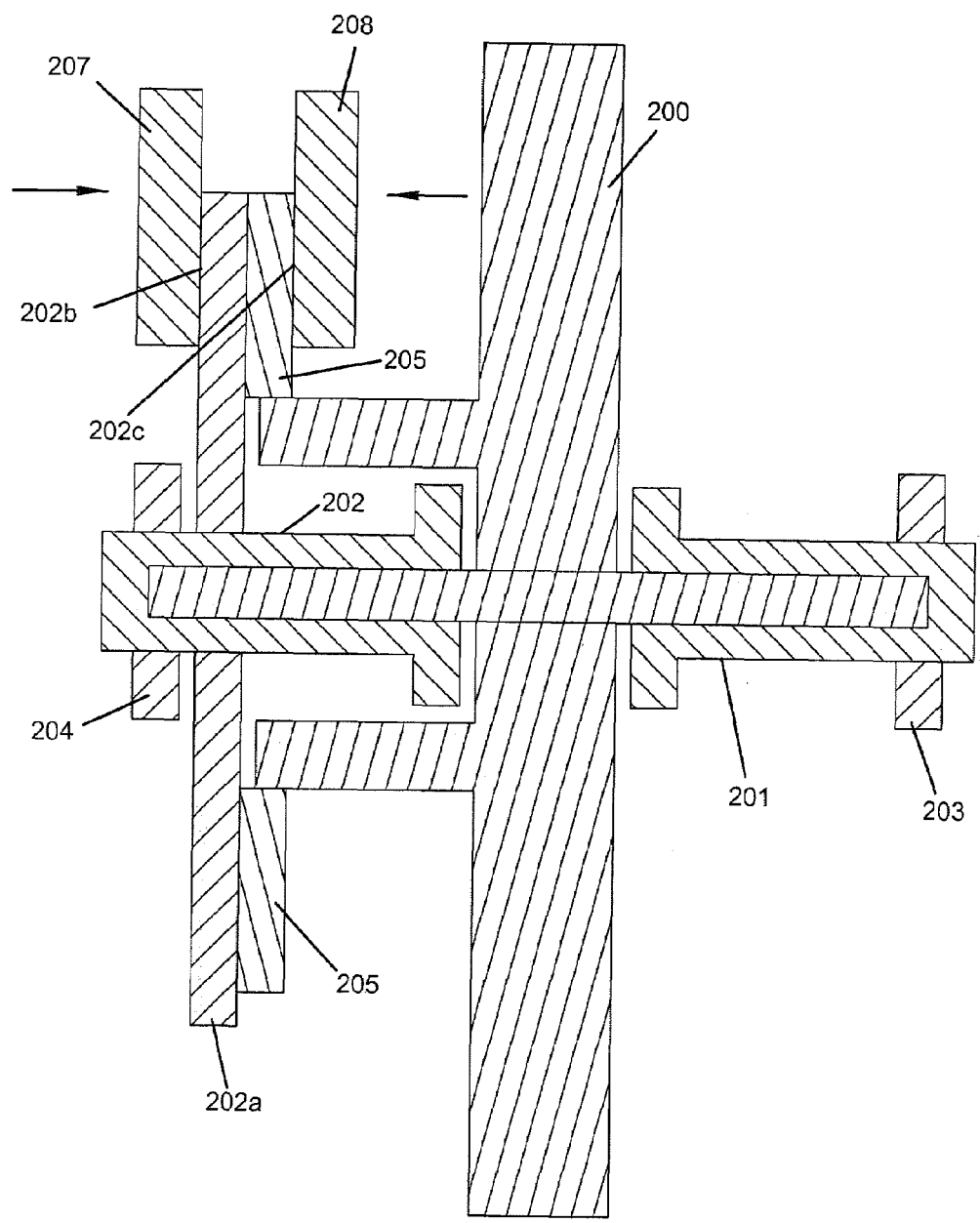
FIG. 14 is a schematic representation of another embodiment of the present invention.

In FIG. 14, this embodiment demonstrates the use of a rotary friction surface as being part of the differential side gear. For all of FIGS. 14-18, the specific configurations and attachments of the parts are not necessary as one skilled in the art readily will appreciate the relationships, in light of the detailed discussion with respect to FIGS. 1-13. As in FIGS. 1-13, the embodiments shown in FIG. 14-18, all have the differential carrier supported by the side gears.

Referring now to FIG. 14, there is shown a differential carrier 200 with side gears 201 and 202. Incorporated into and integral to the side gear 202 is a plate 202a that has friction surfaces 202b and 202c. Bearings 203 and 204 support the side gears 201 and 202. The plate 202a, similar to the plate 45 is operatively connected to the side gear. However in this embodiment it is incorporated integrally into the side gear. A carrier rotary friction plate 205 is adjacent the plate 202a, similar to plates 44 and 45 being adjacent to each other in the first embodiment. Plates 207 and 208 are dual moveable stationary plates that squeeze the friction plates 202a and 205. The plates 207 and 208 react out to the case and are operatively connected to the case. The plates 207 and 208 provide for the moveable translational movement.

Figure 15:
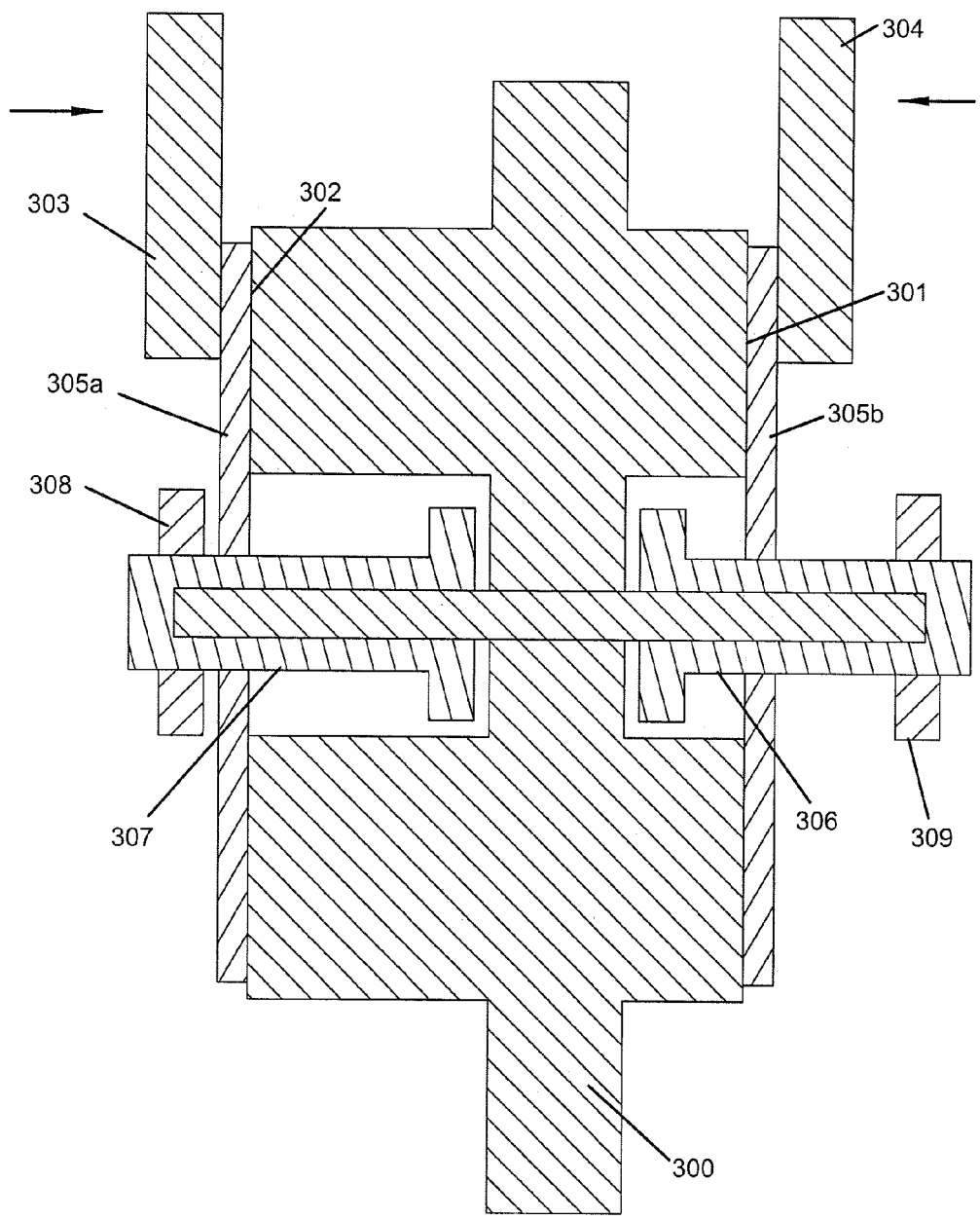
FIG. 15 is a schematic of another embodiment of the present invention.

Referring now to FIG. 15, there is demonstrated the concept of a rotary friction surface being a portion of the differential carrier. The differential carrier 300 has friction surfaces 301 and 302 integral with the carrier 300. Two rotary side gear friction plates 305a and 305b are positioned proximate the surfaces 301 and 302, although only one is necessary. Two moveable stationary friction plates are positioned adjacent the side gear rotary friction plates. Again, side gears 306 and 307 are supported by bearings 308 and 309. In this embodiment shown in FIG. 15, the differential carrier 300 incorporates the rotary side friction plates of the first embodiment either as operatively connected to or an integral portion of the carrier 300. Plates 303 and 304 are operatively connected to the case through a force applying axial member.

Figure 16:
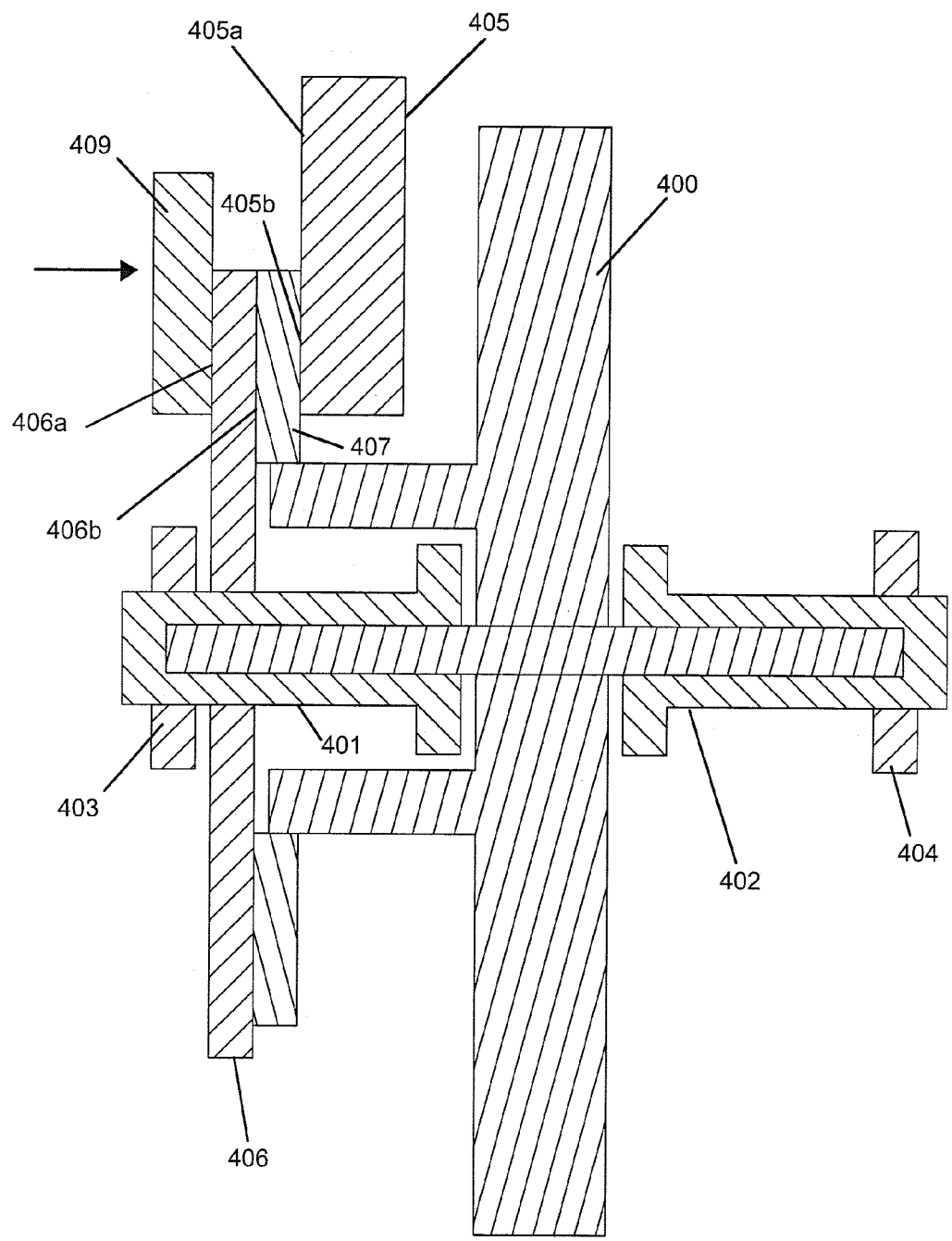
FIG. 16 is a schematic of another embodiment of the present invention.

In FIG. 16, there is schematically shown a differential carrier 400 and two side gears 401 and 402 supported by bearings 403 and 404. This embodiment shows the concept of a stationary friction surface being incorporated into a portion of the case. The case is represented by member 405 and formed therein is a surface 405a that has a case friction surface 405b. A rotary side gear friction plate 406, having friction surfaces 406a and 406b, is operatively connected to the side gear 401 by suitable means such as that described with respect to the first embodiment. Adjacent the rotary side gear friction plate is a rotary carrier friction plate 407 suitably mounted on the carrier 400 by suitable means such as that previously described with respect to the other embodiments. A moveable stationary friction plate 409 is suitably mounted to react through the case 405 and squeezes the friction plates 406 and 407 against the case 405. Plate 409 is operatively connected to the case through a force applying member.

Figure 17:
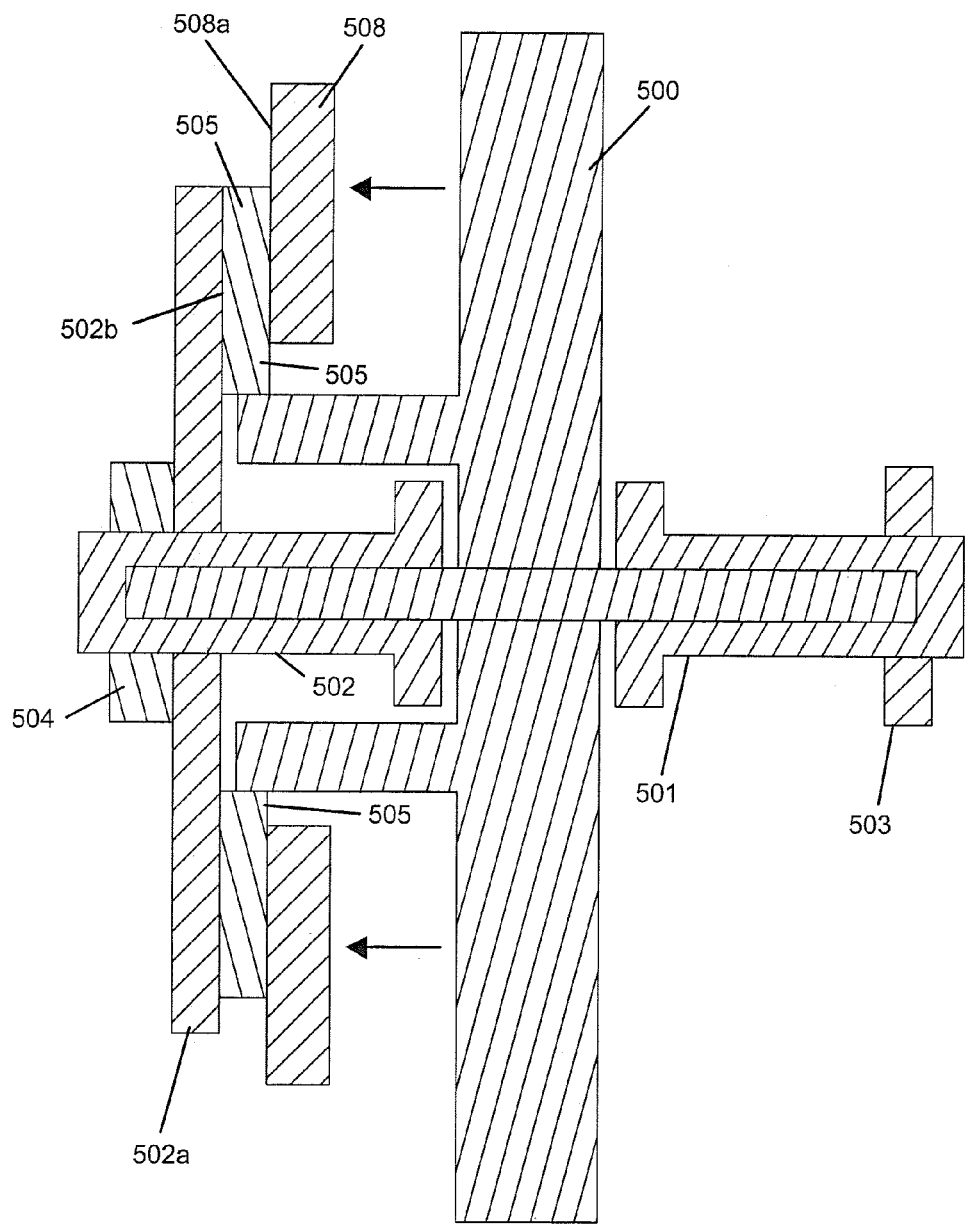
FIG. 17 is a schematic of another embodiment of the present invention.

The embodiment shown in FIG. 17 demonstrates the concept of at least two carrier rotary friction surfaces and one limited rotation or stationary friction surface and a rotary side gear friction surface used in a braking application. The embodiment includes a differential carrier 500 and side gears 501 and 502 mounted on bearings 503 and 504. The bearing 504 accepts thrusts and radial loading. The side gear 502 has a plate 502a (having a friction surface 502b) that is a portion of or integral with the side gear 502, similar to that described with respect to FIG. 16. A rotary carrier friction plate 505 is suitably mounted to the differential carrier 500 similar to the first embodiment described in FIGS. 1-13. Finally, a force-applying member 508 with a single limited rotation surface 508a is provided and pushes the friction plates 505 and 502a and reacts through the angular thrust-bearing 504 and the case. Member 508 is operatively connected to the case through a force applying member.

Figure 18:
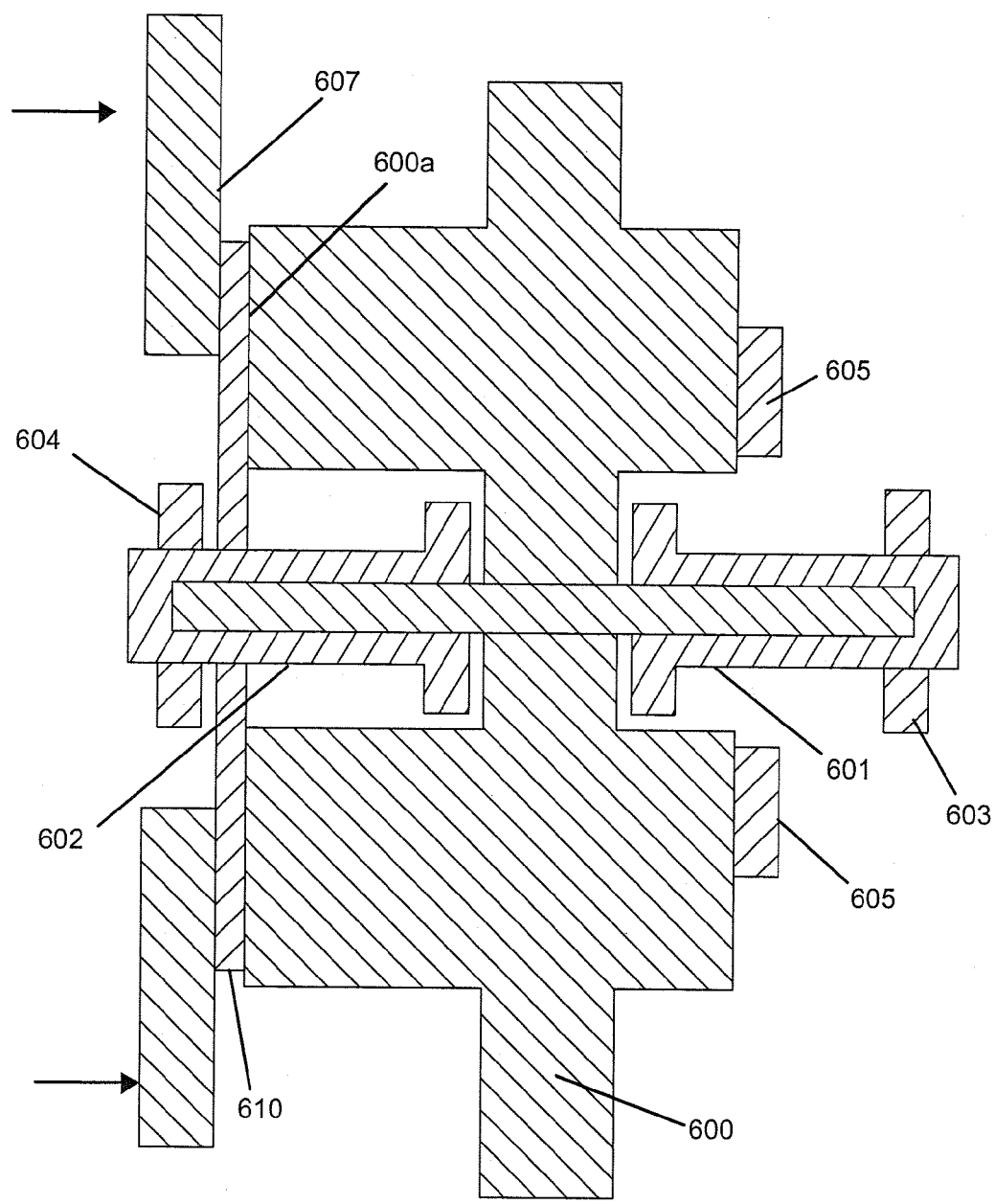
FIG. 18 is a schematic of another embodiment of the present invention.

FIG. 18 discloses an embodiment that demonstrates the concept of a single carrier rotary friction surface and a single limited rotation or stationary friction surface and a rotary side gear friction plate used in a braking operation. The embodiment shown in FIG. 18 includes a differential carrier 600 having first and second side gears 601 and 602 supported by bearings 603 and 604. A thrust bearing 605 is capable of supporting radial and thrust loads and is supported through the case. The differential carrier 600 includes a single friction surface 600a that interacts (through rotary side gear friction plate 610) with a force-applying member 607 with limited rotation. Member 607 is operatively connected to the case through a force applying member.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A brake system for use in a vehicle having an axle, the brake system comprising:
   a) a differential carrier and an output gear operatively connected thereto;
   b) a case defining a cavity for housing the differential carrier;
   c) at least one carrier rotary friction surface operatively connected to the differential carrier;
   d) a differential mechanism having first and second differential side gears;
   e) at least one side gear rotary friction surface operatively connected to one of the first and second differential side gears;
   f) at least one limited rotary friction surface operatively connected to the case whereby during a vehicle braking operation the at least one carrier rotary friction surface and the at least one side gear rotary friction surface are pressed together with the at least one limited rotary friction surface causing simultaneous braking of:
      (i) the differential carrier relative to the case, for vehicle braking causing resistance to rotation of the axle;
      (ii) one of the side gears to the differential carrier, for braking the differential; and
      (iii) the one of the side gears to the case for vehicle braking causing resistance to rotation of the axle; and
   g) the carrier is supported by the first and second differential side gears.

2. The brake system of claim 1, wherein the differential carrier and the output gear are integral.

3. The brake system of claim 1, further comprising a force applying member moveable in an axial direction whereby movement causes contact between the at least one side gear rotary friction surface and the at least one carrier rotary friction surface and the at least one limited rotary friction surface thereby causing braking.

4. The brake system of claim 1, further comprising at least one or more carrier rotary friction plates and at least one or more differential side rotary friction plates arranged axially alternating with at least one or more limited friction plates.

5. The brake system of claim 4, wherein the limited rotary friction surfaces are stationary.

6. The brake system of claim 5, further comprising:
   a) a plurality of pockets formed in the cavity of the case;
   b) a ball ramp plate positioned proximate the pockets, the ball ramp plate having a plurality of cam grooves;
   c) a plurality of balls positioned in the pockets and cam grooves; and
   d) a brake lever operatively connected to the ball ramp plate, wherein the brake lever causes rotational movement of the ball ramp and movement of the balls in the cam grooves results in translational movement of the ball ramp plate thereby squeezing together the rotary friction plates and the stationary friction plates.

7. The brake system of claim 1, further comprising the at least one carrier rotary friction surface and the at least one side gear rotary friction surface are positioned adjacent to each other and have direct contact during a braking event, whereby braking torque biasing is reduced.

8. A brake system for use in a vehicle having an axle, the brake system comprising:
   a) a differential carrier and an output gear operatively connected thereto;
   b) a case defining a cavity for housing the differential carrier;
   c) at least one carrier rotary friction plate operatively connected to the differential carrier;
   d) a differential mechanism having first and second differential side gears;
   e) at least one side gear rotary friction plate operatively connected to one of the first and second differential side gears;
   f) at least one limited rotary friction plate operatively connected to the case whereby during a vehicle braking operation the at least one carrier rotary friction plate and the at least one side gear rotary friction plate are pressed together with the at least one limited rotary friction surface causing simultaneous braking of:
      (i) the differential carrier relative to the case, for vehicle braking causing resistance to rotation of the axle;
      (ii) one of the side gears to the differential carrier, for braking the differential; and
      (iii) the one of the side gears to the case for vehicle braking causing resistance to rotation of the axle; and
   g) the carrier is supported by the first and second differential side gears.

* * * * *